(12) United States Patent
Baird et al.

(10) Patent No.: US 9,879,513 B2
(45) Date of Patent: Jan. 30, 2018

(54) SYSTEM AND METHOD OF PRODUCING OIL

(71) Applicant: PRECISION COMBUSTION, INC., North Haven, CT (US)

(72) Inventors: Benjamin Baird, New Britain, CT (US); Sandeep Alavandi, Hamden, CT (US); J. Kevin Burns, Branford, CT (US); Bruce Crowder, North Haven, CT (US); Brian Kay, Calgary (CA); Richard Mastanduno, Milford, CT (US); Curtis Morgan, Southington, CT (US); Chester Ledlie Sandberg, Palo Alto, CA (US)

(73) Assignees: PRECISION COMBUSTION, INC., North Haven, CT (US); GENERAL ENERGY RECOVERY, INC., Calgary (CA)

( * ) Notice: Subject to any disclaimer, the term of this patent is extended or adjusted under 35 U.S.C. 154(b) by 397 days.

(21) Appl. No.: 14/594,467

(22) Filed: Jan. 12, 2015

(65) Prior Publication Data

US 2015/0198025 A1 Jul. 16, 2015

Related U.S. Application Data

(60) Provisional application No. 61/927,148, filed on Jan. 14, 2014.

(51) Int. Cl.
  *E21B 43/243* (2006.01)
  *E21B 36/02* (2006.01)
  *E21B 43/24* (2006.01)

(52) U.S. Cl.
  CPC ............ *E21B 43/243* (2013.01); *E21B 36/02* (2013.01); *E21B 43/2408* (2013.01)

(58) Field of Classification Search
  CPC ..... E21B 43/243; E21B 43/2408; E21B 36/02
  See application file for complete search history.

(56) References Cited

U.S. PATENT DOCUMENTS 2,168,313 A 8/1939 Bichowsky
3,456,721 A 7/1969 Smith
(Continued)

FOREIGN PATENT DOCUMENTS

| CA | 2716614 A1 | 4/2011 |
| EP | 2612983 A1 | 10/2013 |
| WO | 9724510 A1 | 7/1997 |
| WO | 2009009447 A2 | 1/2009 |
| WO | 2013016685 A1 | 1/2013 |

OTHER PUBLICATIONS

Barillas, J. L. M. et al; Improved Oil Recovery Process for Heavy Oil: A Review; Brazilian Journal of Petroleum and Gas; 2008; v2, No. 1, pp. 45-54.
(Continued)

*Primary Examiner* — David L Andrews
(74) *Attorney, Agent, or Firm* — Cantor Colburn LLP

(57) ABSTRACT

A system and method of producing oil is provided. The system includes a support module that provides air, water and fuel to a well. A steam generator is fluidly coupled to the support module to receive the air, water and fuel. The steam generator includes an injector having a plurality of tubes. The tubes have an outer surface with an oxidation catalyst thereon. The steam generator is configured to divide the supplied air and direct a first portion through the tubes. A second portion of the supplied air is mixed with supplied fuel and directed over the outside of the tubes. The air and fuel is burned in a combustor and water is sprayed on the combustion gases to produce steam. The steam and combustion gases are directed in the direction of the oil reservoir.

28 Claims, 12 Drawing Sheets

(56) References Cited

U.S. PATENT DOCUMENTS

| | | | |
|---|---|---|---|
| 3,700,035 | A | 10/1972 | Lange |
| 3,982,591 | A | 9/1976 | Hamrick et al. |
| 4,053,015 | A | 10/1977 | Hamrick et al. |
| 4,078,613 | A | 3/1978 | Hamrick et al. |
| 4,243,098 | A | 1/1981 | Meeks et al. |
| 4,336,839 | A | 6/1982 | Wagner et al. |
| 4,377,205 | A | 3/1983 | Retallick |
| 4,444,257 | A | 4/1984 | Stine |
| 4,522,263 | A | 6/1985 | Hopkins et al. |
| 7,121,342 | B2 | 10/2006 | Vinegar et al. |
| 7,497,253 | B2 | 3/2009 | Retallick et al. |
| 7,665,525 | B2 | 2/2010 | Pfefferle |
| 7,712,528 | B2 | 5/2010 | Langdon et al. |
| 7,874,350 | B2 | 1/2011 | Pfefferle |
| 8,091,625 | B2 | 1/2012 | Ware et al. |
| 2003/0044331 | A1 | 3/2003 | Debellis et al. |
| 2005/0239661 | A1 | 10/2005 | Pfefferle |
| 2006/0042794 | A1 | 3/2006 | Pfefferle |
| 2006/0162923 | A1 | 7/2006 | Ware |
| 2008/0098738 | A1 | 5/2008 | Pfefferle |
| 2010/0181069 | A1 | 7/2010 | Schneider et al. |
| 2011/0170844 | A1 | 7/2011 | Schultz et al. |
| 2013/0087337 | A1 | 4/2013 | Gonzalez et al. |

OTHER PUBLICATIONS

Cairns, Paul-Emanuel; High Pressure Oxy-fired (HiPrOx) Direct Contact Steam Generation (DCSG) for steam Assisted Gravity Drainage (SAGD) Application; Recherche uO; 2013; p. 1.
Capper, Laura et al; Advancing Thermal and Carbon Dioxide Recovery Methods Beyond their Conventional Limits: Downhole Innovation; Society of Petroleum Engineers; 2011; pp. 1-24.
Castrogiovanni, Anthony et al; Benefits and Technical Challeges of Downhole Steam Generation for Enhanced Oil Recovery; Canadian Society for Unconventional Gas; 2011; pp. 1-11.
Donaldson, A. B.; Reflections on a Downhole Steam Generator Program; Society of Petroleum Engineers; 1997; pp. 227-236.
Downhole Steam Generation Pushes Recovery Beyond Conventional Limits; Journal of Petroleum Technology; http://www.mydigitalpublication.com/display_article.php?id=1151790; Sep. 2012; pp. 1-3.
Downhole Steam Generation Pushes Recovery Beyond Coventional Limits; Journal of Petroleum Technology; http://www.bluetoad.com/display_article.php?id=1082634; Jun. 2012; pp. 1-3.
Downhole Steam Generation: Forums: Insitu Processes; http://ioredge.com/forums/thread/?id=50; Aug. 21, 2013; p. 1.
Lombard, Michael S. et al.; New Advances and a Historical Review of Insulated Steam-Injection Tubing; https://www.onepetro.org/conference-paper/SPE-113981-MS; Nov. 11, 2014; Abstract; pp. 1-2.
Simple Oilsands Technologies; Ex-Tar Technologies Inc.; http://ex-tar.com/technologies/; Aug. 21, 2013; pp. 1-9.
Weissman, Jeffrey G.; Review of Processes for Downhole Catalytic Upgrading of Heavy Crude Oil; http://www.sciencedirect.com/science/article/pii/S0378382096010673; Nov. 11, 2014; Abstract; p. 1-2.
International Preliminary Report on Patentability for Application No. PCT/US2015/011090 dated Jul. 28, 2016; 14 pgs.
International Search Report and Written Opinion for Application No. PCT/US2015/011090 dated Jun. 3, 2015; 21 pgs.
Spark Plug Terms (I), NGK Spark Plugs, Nov. 9, 2012, retrieved from the Internet: <https://www.ngk.com/glossary/8/spark-plug/1>: pp. 1-3.

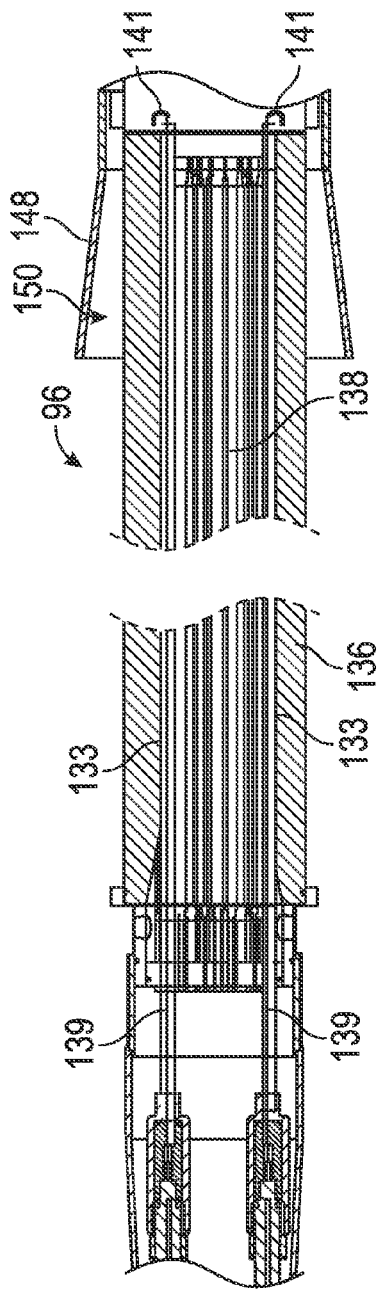
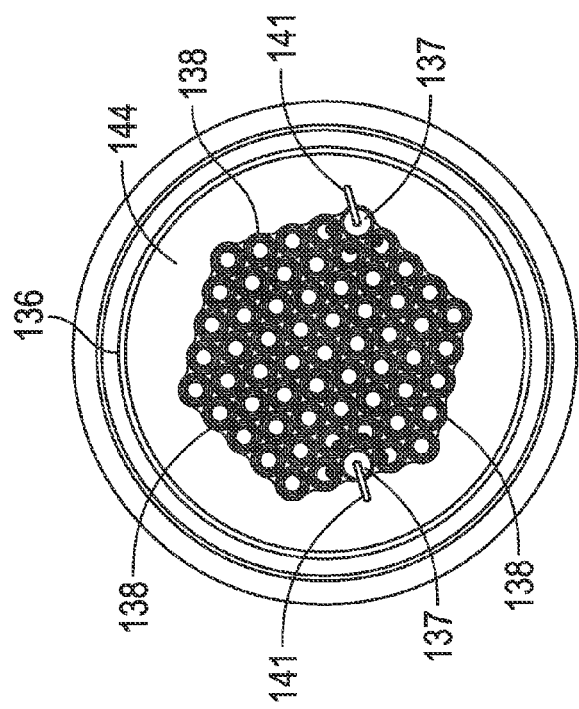
FIG. 11C
FIG. 11D

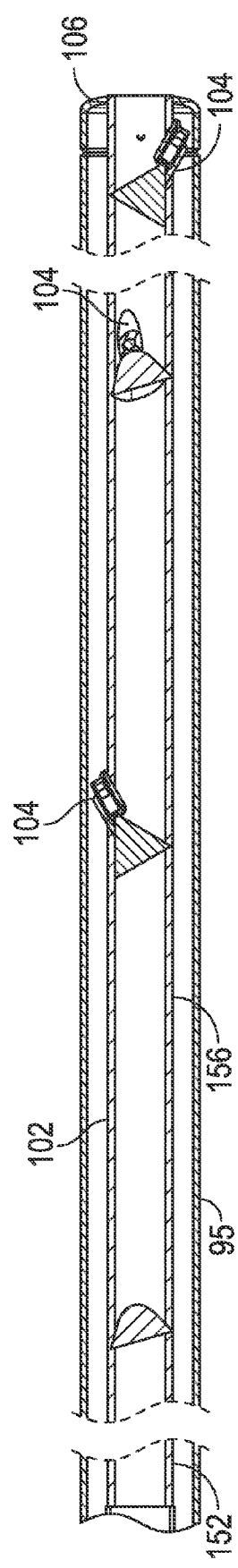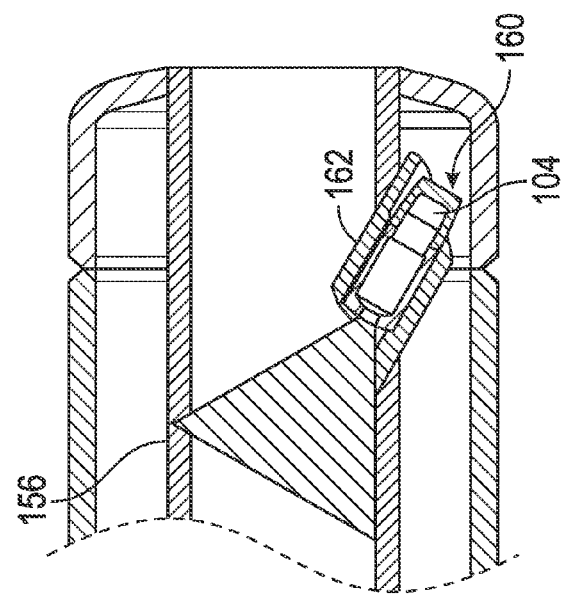

SYSTEM AND METHOD OF PRODUCING OIL

CROSS-REFERENCE TO RELATED APPLICATIONS

The present Application is a nonprovisional application of U.S. Provisional Application Ser. No. 61/927,148 filed on Jan. 14, 2014 entitled "System and Method of Producing Oil", the contents of which are incorporated by reference herein.

BACKGROUND OF THE INVENTION

The subject matter disclosed herein relates to a system and method for the recovery of crude oils within the earth and, in particular, to a system and method for recovering highly viscous oils.

The world depends heavily on hydrocarbon fuels, such as petroleum, as an energy source. Petroleum hydrocarbons, or "oil," may be recovered from reservoirs within the earth using a variety of methods, such as drilling for example. Drilling works well for certain categories of oil where the oil viscosity allows the fluid to flow within the well casing to the surface. Where deep oil reserves are being exploited, pumps and other auxiliary equipment may be used to assist the extraction of oil.

One category of oil, sometimes referred to as "heavy oil" or "extra-heavy oil" or "bitumen" (hereinafter called "heavy oil"), is highly viscous oil that does not readily flow through the reservoir or production well casing, even with the assistance of pumps or other equipment. This flow or mobility issue may also be caused by compounds such as wax or paraffin. Heavy oil may be extracted using a variety of non-thermal techniques such as mining and cold heavy oil production with sand (CHOPS). However, most of these heavy oil reserves are positioned at depths greater than that from which it may be recovered using mining techniques, and other non-thermal methods such as CHOPS do not produce a high enough fraction of the original oil in place. In an effort to extract this oil, so-called "thermal methods" such as cyclic steam ("huff and puff"), steam flooding, and steam assisted gravity drainage ("SAGD") have been developed. In these, steam is generated at the surface and transferred down into the well into contact with the oil reserve. The steam heats and reduces the viscosity of the oil enough to allow flow and displacement of the treated oil toward the production wellhead.

It should be appreciated that while such surface steam based generating processes do allow for the extraction of heavy oil from reservoirs that were previously unrecoverable by mining techniques, surface steam generation processes generally do incur high energy costs and there is a limit to the depth at which these techniques may be used. It should be appreciated that these processes involve energy losses at several stages: in the steam generation process; in distributing the steam at the surface; and, as the steam is transferred from the surface. Past a certain depth, the cost or technical feasibility of using surface generated steam is prohibitive. Even before that depth is reached, the energy and other costs of producing the oil can be very high. As a result, a large volume of the world's oil reserves are classified as "unrecoverable" due to the depth and viscosity of the oil, and even recoverable oil may face high production costs. It should further be appreciated that other geographic locations or geologic formations also may not be conducive to surface steam based methodologies. For example, in permafrost areas, surface heat based generation may not be acceptable as the heat may cause a thawing of the ground supporting the oil recovery equipment. Surface steam based generation systems may also be of limited use in oceanic reserves where the loss of thermal energy between the surface heat generator to the ocean floor may make the use of surface steam techniques economically and technically infeasible.

Accordingly, it should be appreciated that while existing heavy oil extraction techniques are suitable for their intended purposes a need for improvement remains, particularly in providing a system and method for extracting heavy oil reservoirs located deep within the earth.

BRIEF DESCRIPTION OF THE INVENTION

According to one aspect of the invention, a system for producing oil from an oil reservoir is provided. The system comprising a support module and a steam generator. The support module including an air module, a water module, and a fuel module, wherein the air module, water module and fuel module configured to provide air, water and fuel to an oil well. The steam module includes a steam generator including an injector having a plurality of tubes having an oxidizing catalyst thereon, a combustor is fluidly coupled to the injector to receive air and an air-fuel mixture and burn the air and an air-fuel mixture, a steam generator portion is fluidly coupled to receive combustion gases from the combustor, the steam generator portion having at least one nozzle configured to direct water from the water module into the combustion gases to generate steam, the steam generator is configured to direct the steam and combustion gases in the direction of the oil reservoir. A connector configured to fluidly couple the air module, water module and fuel module to the steam generator.

According to another aspect of the invention, a method of producing oil from an oil reservoir is provided. The method includes supplying air, water and fuel to a steam generator. The supplied air is divided into a first portion and a second portion. The second portion is mixed with the supplied fuel. The first portion of air flows through reactor tubes, the reactor tubes having an oxidation catalyst on an outer surface. The mixed second portion of air and supplied fuel lows over the outer surface of the reactor tubes. The first portion of air and the mixed second portion of air and supplied fuel are mixed in a combustor. The mixed first portion of air and the mixed second portion of air and supplied fuel are burned to produce combustion gases. Water is sprayed onto the combustion gases to form steam. The steam and combustion gases are directed in the direction of an oil reservoir.

In accordance with another embodiment of the invention, a system for producing oil from an oil reservoir having a well is provided. The system including a support module having: an air module; a water module; and a fuel module. A steam module is provided having: a system casing; a mixer portion disposed within the system casing. The mixer portion having a housing and conduit centrally disposed within the housing, an outside periphery of the conduit and the inside periphery of the housing cooperating to define a hollow interior portion. The conduit has a plurality of openings disposed about a periphery of one end of the conduit, the plurality of openings arranged to fluidly couple the hollow interior portion with an interior portion of the conduit. A first inlet is arranged on one end of the housing arranged to fluidly couple to the fuel module to the hollow interior portion. A second inlet on the end of the housing arranged to fluidly couple the air module to the hollow interior portion.

In accordance with still another embodiment of the invention, a system for producing oil from an oil reservoir having a well is provided. The system including: a system casing; a combustor arranged within the system casing and configured to combust a fuel during operation; a diluent generator having a first end fluidly coupled to receive combustion gases from the combustor, the diluent generator further having a second end fluidly coupled to the oil reservoir; a diluent conduit fluidly arranged between the inner surface of the system casing and an outside surface of the combustor and the diluent generator; and at least one nozzle coupled to the outside surface of the diluent generator and configured during operation to spray a diluent fluid into the combustion gases in the diluent generator, a direction of spray being at least partially towards the first end.

In accordance with still another embodiment of the invention, a system for producing oil from an oil reservoir having a well is provided. The system having: a system casing; a fuel conduit (115) and an oxidant conduit (114) movably arranged within the system casing; a mixer arranged within the system casing and configured to receive an oxidant and a fuel from the fuel conduit and the oxidant conduit, a combustor portion disposed within the system casing and operably coupled to an end of the mixer and configured to form combustion gases; a diluent generator portion disposed within the system casing and operably coupled to the combustor portion opposite the mixer, the diluent generator portion having a terminal end coupled to the system casing; and at least one centering member slidably engaging an inside surface of the system casing and is operably coupled to a periphery at least one of the mixer, the combustor portion and the diluent generator portion.

In accordance with still another embodiment of the invention, a system for producing oil from an oil reservoir having a well is provided. The system including: a system casing; an injector disposed within the system casing and fluidly coupled to a fuel conduit, the injector having a plurality of tubes having an oxidizing catalyst thereon, the injector having at least one igniter integrally formed therein, the at least one igniter having a spark mechanism on one end; a combustor disposed within the system casing and fluidly coupled to the injector adjacent the spark mechanism, the combustor configured to receive during operation an air-fuel mixture and burn the air-fuel mixture in response to the spark mechanism being activated; and a diluent generator disposed within the system casing and arranged to receive combustion gases from the combustor and mix a diluent fluid with the combustion gases.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 11C and 11D are views of the catalytic reactor portion of the downhole apparatus of FIG. 6 in accordance with an embodiment of the invention;

FIG. 13 is a partial side sectional view of the steam generation portion of the downhole apparatus of FIG. 6; and FIG. 14 is a partial enlarged side sectional view of the steam generation portion with a water injector.

Figure 1:
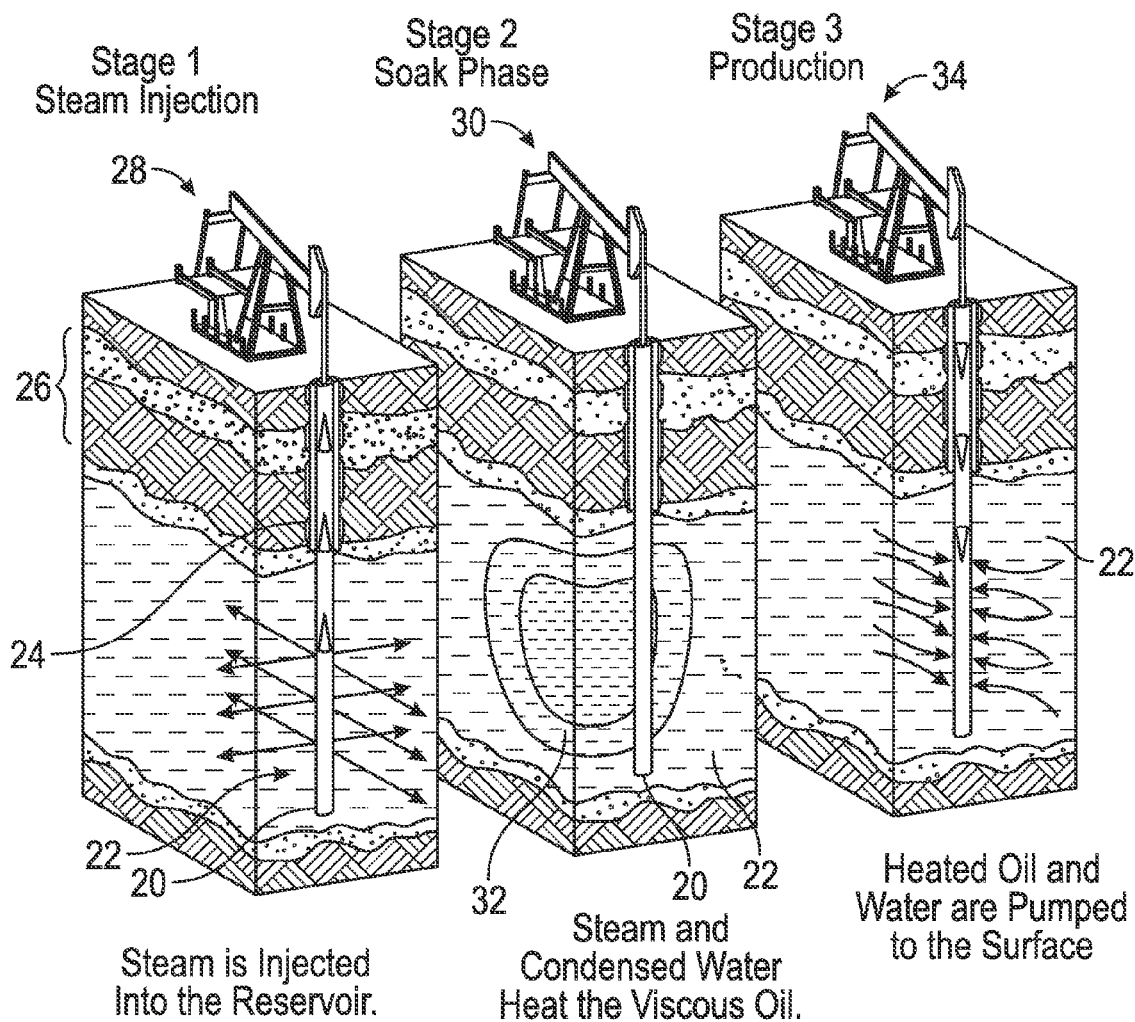
FIG. 1 is perspective view, partially in section, of an oil extraction system at three stages of a cyclic steam stimulation or cyclic steam injection process.

The detailed description explains embodiments of the invention, together with advantages and features, by way of example with reference to the drawings.

DETAILED DESCRIPTION OF THE INVENTION

Embodiments of the present invention provide advantages in extracting heavy oil by in situ generation of a diluent such as steam within an oil reservoir. Further embodiments of the invention provide advantages in reducing the loss of thermal energy between the location of the steam generation and the oil reservoir. Still further embodiments of the invention provide advantages in reducing the costs and emissions associated with the extraction of heavy oil from a reservoir. Yet still further embodiments of the invention provide advantages in allowing the sequestration of carbon dioxide ($CO_2$) generated during oil production within the earth.

Embodiments of the present invention also provide advantages in the rate of oil production and in the total amount of oil produced of the original oil in place (OOIP). The combination of combustion products and the injected diluent (steam or other) provide a mechanism for achieving oil mobility, which offers opportunity for improved production. In addition, the downhole injection offers the opportunity to precisely target the release of steam into the reservoir by location of the tool potentially augmented by other techniques such as the use of packers and wellbore perforations to further target the injection zone.

An embodiment of the present invention involves the use of $CO_2$, Nitrogen or other diluent in place of liquid water. In the case of $CO_2$, the $CO_2$ provides advantages in cooling the combustion gas flow to a more moderate temperature while also having the advantage that a greenhouse gas is injected downhole for potential sequestration for example. The use of $CO_2$ may also provide a fluid to carry the heat from the combustion process to the oil. As used herein, the term "steam" should be understood to refer to the diluent carrier fluid delivering heat to the oil.

An embodiment of the present invention also involves the co-injection of additive materials into the heated product from the tool at some stage. In one embodiment, the co-injection of additive materials occurs at the surface for feeding into the fluid's umbilical line or subsequently through a separate umbilical line. Such co-injection of additive materials could be helpful for a variety of purposes, including for startup or for anti-corrosive purposes or for downhole injection of a heated solvent for example.

Other embodiments of the present invention involve the capability to use water of lower levels of water treatment than that now used for surface boilers or once-through steam generators (OTSRs). These embodiments also offer differing susceptibilities to scaling and corrosion than those involved in boilers and once-through steam generators, providing for use of less costly water treatment processes in conjunction with the system.

In accordance with embodiments of the subject invention, a direct-fired downhole diluent system, such as steam system 20 for example, may be used in a variety of oil production configurations, shown in FIGS. 1-4, for the extraction of heavy oil from an oil reservoir. As used herein, the term heavy oil means a hydrocarbon based petroleum material having a reservoir viscosity of greater than 1000 centipoise (cP) to greater than 100,000 cP. It should be appreciated that while embodiments herein describe the use of the direct-fired downhole steam system 20 in connection with the extraction of heavy oil from deep reservoirs, this is for exemplary purposes and the direct-fired downhole steam system 20 may be used in any application where generation and injection of a diluent, such as steam for example, into a material or other enclosed space is desired. For example, embodiments of the subject invention may also be used in underwater, permafrost-regions and arctic/Antarctic applications where thermal losses from surface generated steam adversely impact the feasibility or extraction costs of the well. Embodiments of this invention may further be used with the extraction of bitumen, bituminous sands, oil sands and tar sands having a viscosity of less than 1,000 cP or secondary or tertiary production of conventional reservoirs. Embodiments of the invention may also offer advantages for surface steam generation or generation in the well bore at a position above the oil reservoir.

Embodiments of the invention may further be used with the downhole apparatus 90 (FIG. 5) located at the surface, retaining the ability to direct fire the combustion process with the steam so that the gases injected into the reservoir contains both steam and combustion gases. While such a device will incur heat losses along the wellbore, it retains other advantages. This may be desirable in some locations rather than placing the downhole apparatus deep within the well. It should be appreciated that while embodiments herein refer to use of the direct-fired downhole steam system 20 with heavy oil, this is for exemplary purposes and embodiments of the invention should not be so limited. Embodiments of the invention may further be used to produce oil of lesser viscosity than heavy oil, where the combustion gas and/or the heat addition prove advantageous in mobilizing such oil in non-primary production processes. Embodiments of the invention may further be used with the downhole apparatus operating at close to atmospheric pressure for direct-fired generation of steam at the surface.

Figure 2:
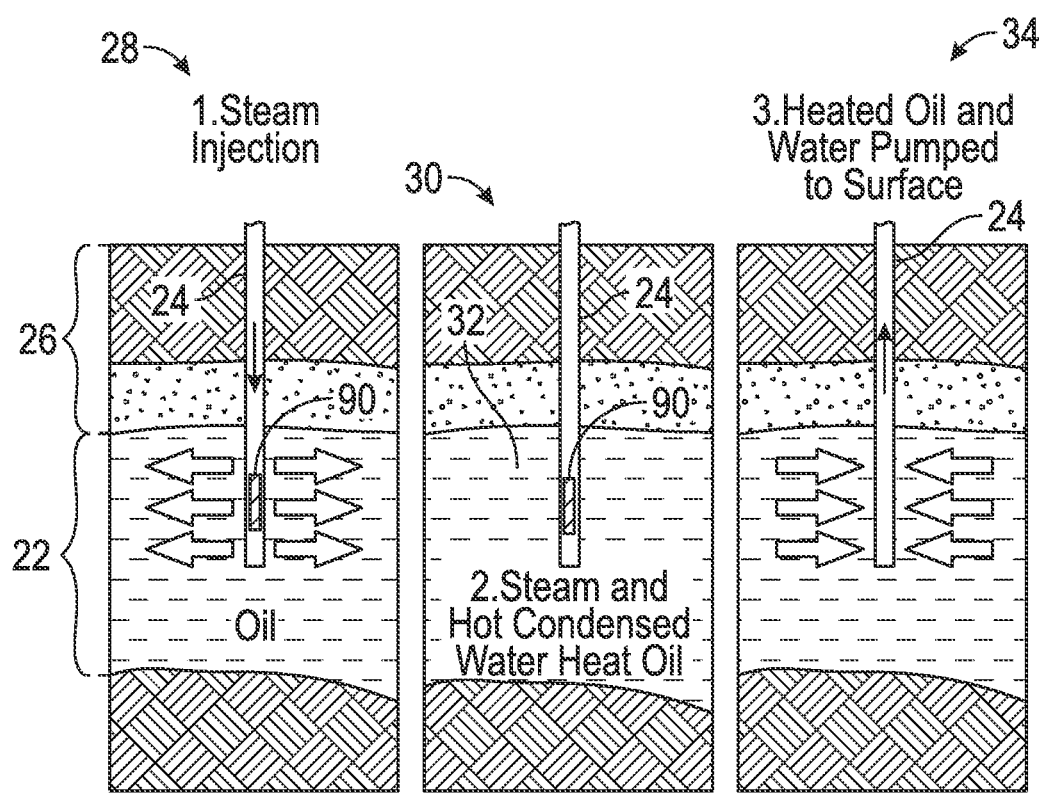
FIG. 2 is a side schematic view of the oil extraction system of FIG. 1.

With reference to FIGS. 1-2, a vertical well configuration is shown where the direct-fired downhole steam system 20 is used to extract heavy oil from a reservoir 22. In this embodiment, a well 24 is formed at a desired location through several layers 26 of earth into a section that includes reservoir 22. In general, as used herein, the reservoir 22 is located at depth where the viscosity of the oil (or the presence of wax or paraffin therein) within the reservoir is too high to allow removal via conventional pumping or mining techniques. As will be discussed in more detail below, a downhole apparatus 90 is inserted at a first stage 28 (FIG. 2) within the casing of the well and positioned within the reservoir 22. Fuel, liquid water, air, and control signals are transferred to the steam generator and steam is produced within the well 24 and the reservoir 22. Steam and combustion gases (including carbon dioxide ($CO_2$)) from the steam generator are injected into the reservoir 22 heating the heavy oil. It should be appreciated that as the heavy oil is heated the viscosity of the heavy oil is reduced. It is also contemplated that the injection of $CO_2$ into the reservoir 22 also increases oil volume and further reduces the oil viscosity. Nitrogen from the combustion gases also assists with reservoir pressurization.

In the second stage 30 of production, the steam and hot condensed water heat the oil in an area 32 surrounding the well 24. Typically in a cyclic steam process, this stage 30, sometimes referred to as a "soak phase" is held for a period of time to allow the heat to permeate the reservoir. In some oil reservoirs, no soak time is used. It should be appreciated that in the second stage 30, the downhole apparatus 90 may remain or may be removed from the well 24. Finally, in the third stage 34, the heated oil and condensed water are extracted from the well 24 using conventional pumping or extraction techniques as is known in the art.

Figure 3:
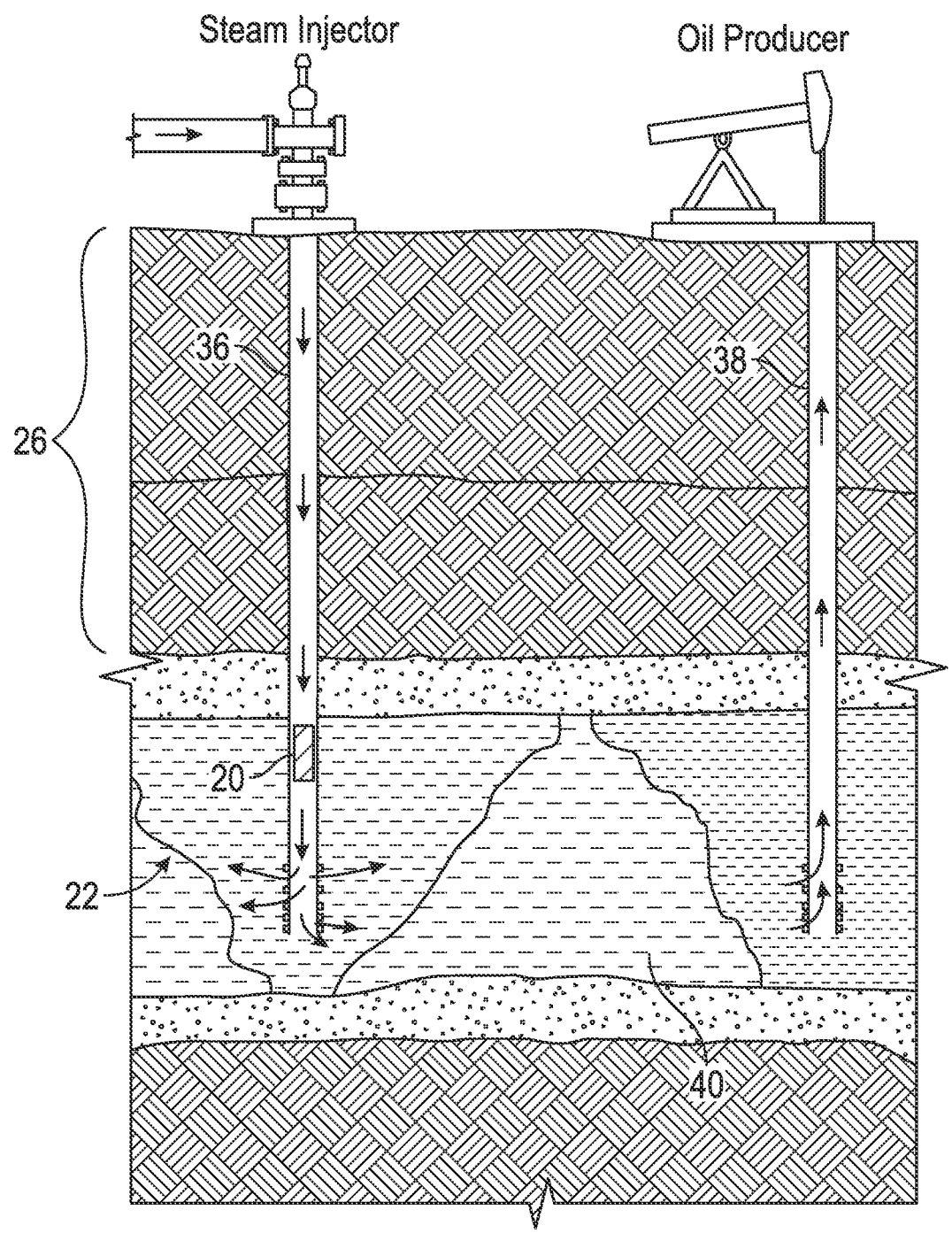
FIG. 3 is a side schematic view of a steam flood oil extraction system.

Referring now to FIG. 3, another extraction configuration is shown which uses a steam injector well 36 and an extraction or production well 38. In this embodiment, an injector well 36 is formed through the layers 26 into the reservoir layer 22. A parallel extraction well 38 is formed adjacent the injection well 36. The direct-fired downhole steam system 20 is inserted into the injector well 36 to produce steam within the reservoir layer 22. As the steam is produced, hot water condenses 40 into the layer 22 reducing the viscosity of the oil. As the oil viscosity lowers, the extraction well 38 may be used to pump the heavy oil from the reservoir layer 22. It should be appreciated that in applications that allow use of the configuration of FIG. 3, that steam heating and oil extraction may occur in parallel.

It should be appreciated that the above description of oil extraction is exemplary and the claimed invention should not be so limited. The claimed invention may be used with any technique wherein the application of heat, pressure, co-injection of diluents, chemicals or solvents, or injections of $H_2O$, $CO_2$, $N_2$ or other gasses will facilitate the extraction of oil. It should be further appreciated that the application of steam to the oil reservoir may be cyclic steam stimulation, continuous (steam flood) or continuous (SAGD).

Figure 4:
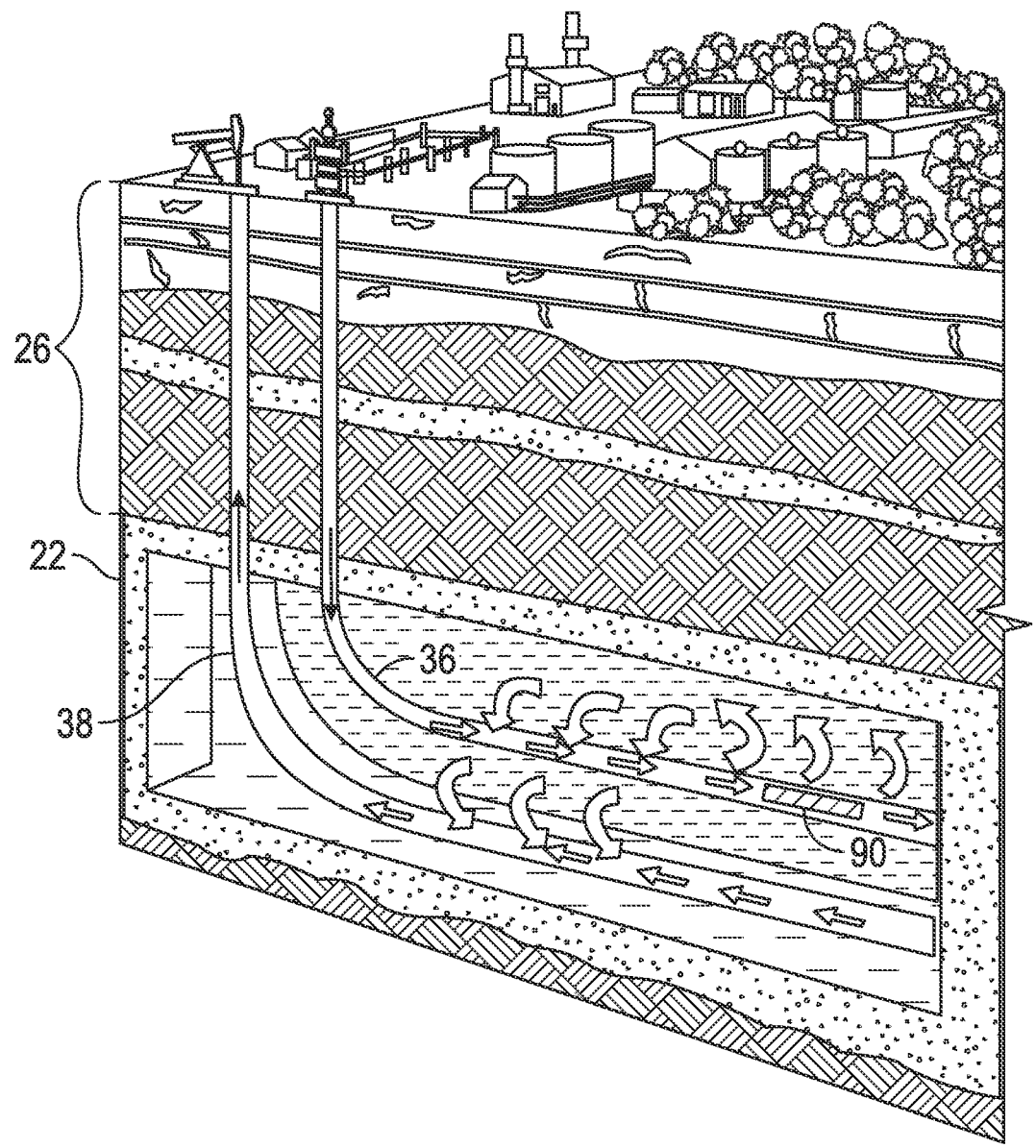
FIG. 4 is a perspective view, partially in section, of a steam assisted gravity drainage (SAGD) system.

A third configuration for oil extraction is shown in FIG. 4, which is similar to the configuration of FIG. 3 where both an injector well 36 containing the direct-fired downhole steam system 20 and an extraction well 38 are used in parallel. In this configuration, the injector well 36 is formed initially in a vertical orientation. As the well 36 extends from the surface, the direction of the well 36 changes to a more horizontal orientation and extends along the length of the reservoir layer 22. The extraction well 38 is formed in a similar manner. In the embodiment shown, the horizontal portion of the extraction well 38 is positioned vertically below the injector well 36. By heating the oil in an area vertically above the extractor well 38, gravity may be used to assist the flow of oil into the extractor well 38.

Figure 5:
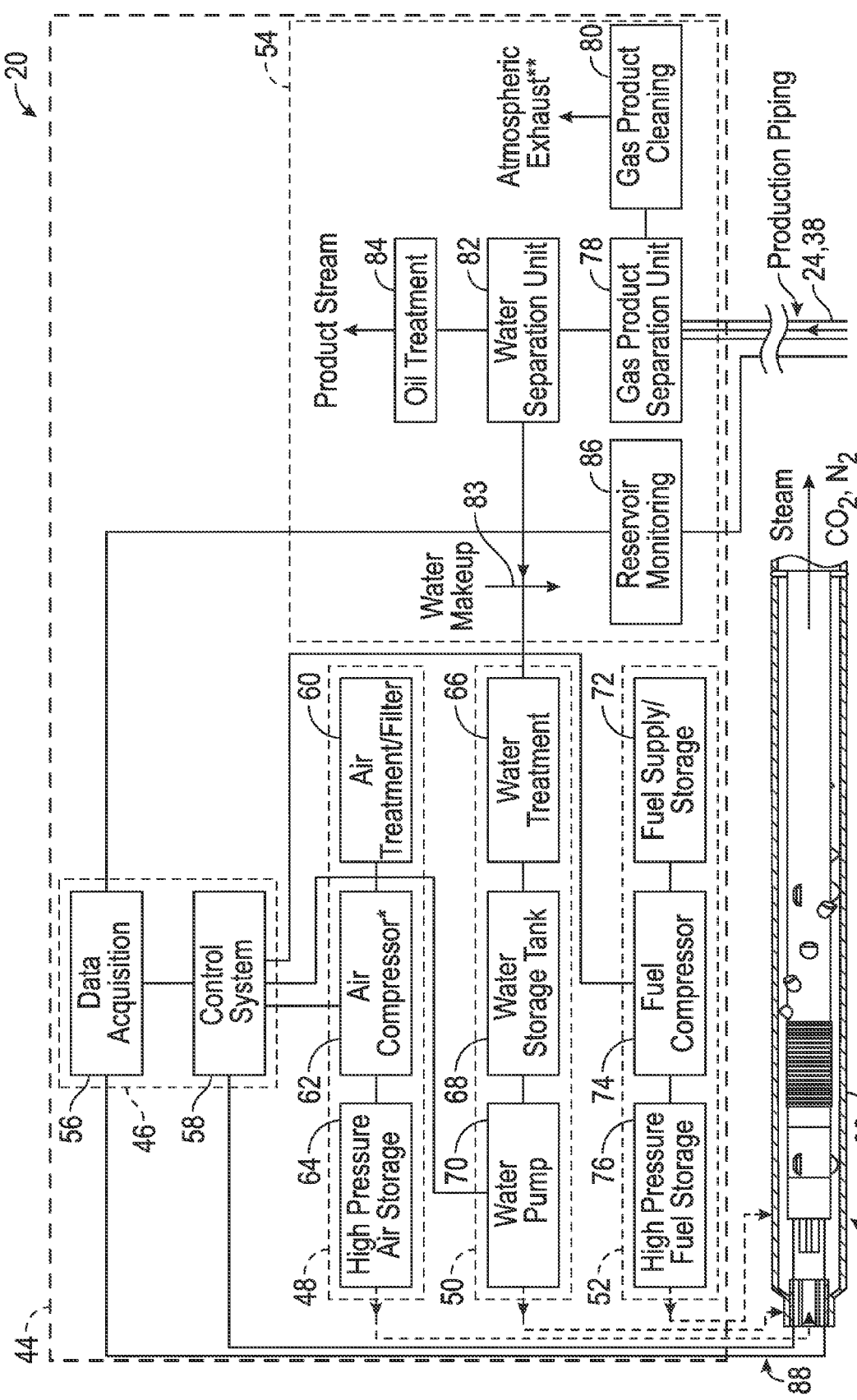
FIG. 5 is a schematic illustration of an in situ heavy oil steam extraction system in accordance with an embodiment of the invention.

Referring now to FIG. 5, an embodiment is shown of the direct-fired downhole steam system 20 that includes a sub-surface module 42 and a support or surface module 44. The surface module 44 includes all of the balance of plant components used to support the operations of the sub-surface module 42. In an embodiment, the surface module 44 includes a control module 46 that is electrically coupled to an air module 48, a water module 50, a fuel module 52 and a production module 54. The control module 46 may have distributed functionality (comprised of a plurality of individual modules), such as a data acquisition system 56 and a processing system 58 for example, or may be an integrated processing system. Control module 46 may also control the distribution of electrical power from the surface to the steam generator location. The fluid conduits along with the power and transmission lines from the surface module 44 are bundled together to extend from the surface to the location where the steam generator will operate. This group of conduits and lines is sometimes referred to as a capillary. In one embodiment, at least a portion of the conduits or lines are bundled prior to the well head to minimize the number of openings or ports in the well head.

The air module 48 provides combustion and cooling air to the sub-surface module 42. The air module 48 may include an air treatment module 60 that receives the intake air and removes/filters undesirable contaminants. The treated air is then compressed with an air compressor 62 and stored in a high pressure storage module 64. The water module 50 includes a water treatment module 66 that receives intake water. In one embodiment, the water module 50 receives water separated from the extracted oil from the production module 54. The water treatment module 66 filters the water and removes undesired contaminants and transfers the cleaned liquid water into a storage module 68 where the water remains until needed by the sub-surface module 42. The liquid water is removed from storage module 68 by a pumping module 70 which is fluidly connected to the sub-surface module 42. Further, in other embodiments, it is contemplated that water may be supplied from a subterranean source, such as an aquifer or nascent water with little or no treatment for steam production at the oil reservoir level.

The fuel module 52 provides a fuel, such as but not limited to natural gas, propane, butane, produced/associated-gas, and syngas (including syngas derived from oil) for example, to the sub-surface module 42. The fuel module 52 includes a storage module 72, a fuel compressor 74 and a high pressure fuel storage module 76. The production module 54 receives oil from the well 24, 38. It should be appreciated that the direct-fired downhole steam system 20 may be used either with the single well configuration of FIGS. 1-2 or the injector/extraction well configuration of FIGS. 3-4. The production module 54 may include a gas separation module 78 that receives a composition from the well 24, 38 that may include oil, water and gaseous by-products ($N_2$, $CO_2$). The gas separation module 78 removes the gaseous products from the composition and transfers these by-products to a cleaning module 80 which processes the gases prior to exhausting to the atmosphere. In one embodiment, a pressure energy recovery system (not shown) may be used instead of exhausting the gases, with potential use of the energy in the compression subsystems or otherwise. The energy recovered from the pressure recovery system could then be used to offset compression power or provide electrical power for support equipment.

The de-gassed composition exits the gas separation module 78 and is transferred to a water separation module 82. As discussed above, the water separation unit 82 may be used to remove water from the oil and transfer the water to the water module 50. In one embodiment, make up water 83 may be added to the water supply prior to or in connection with the inlet to the water module 50. The oil from water separation unit 82 is transferred to an oil treatment module 84 prior to being transferred offsite applications. These treatments may include processes such as de-sulphurization, cracking, reforming and hydrocracking for example. In one embodiment, a monitoring module 86 provides data acquisition and monitoring of the oil reservoir. It should be appreciated that the monitoring module 86 may be integrated into control module 46. It should be appreciated that the water separation or other processes could occur before or simultaneously with the de-gassing operation as may be advantageous.

Figure 6:
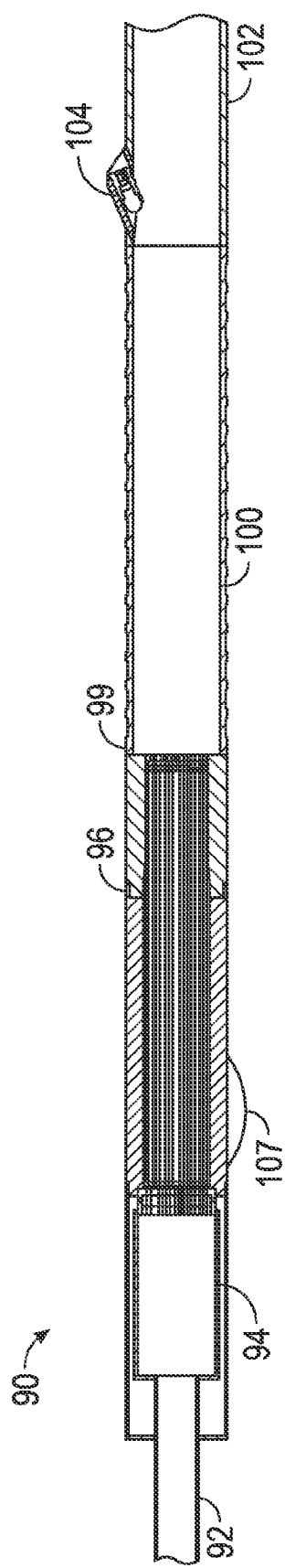
FIG. 6 is a side view, partially in section, of a downhole apparatus for generating steam in accordance with an embodiment of the invention.

Referring now to FIG. 5 and FIG. 6, the data, power, air, water and fuel conduits from the surface modules 46, 48, 50, 52, 54 are transferred via a connection 88, sometimes referred to as an umbilical or capillary, to a downhole apparatus 90. As discussed above, portions of the conduits may be bundled together before or after the well-head. When installed, the downhole apparatus 90 is positioned within a well casing 98 (FIG. 7) near the location where the steam is injected into the formation/reservoir. This could be near the terminal end of the well or at an intermediate location along its length. At the intermediate location, the well casing may have a packer utilized to prevent steam from bypassing the injection zone by preventing or inhibiting steam from flowing along the casing. The downhole apparatus 90 shown in FIGS. 6-8 receives the air and fuel from the umbilical 88 at an interface 92 where it is transferred into a mixer portion 94. The mixer portion 94 divides the supplied air into a first portion and a second portion. As will be discussed in more detail below, the first portion is mixed with fuel while the second portion is used for cooling prior to combustion. The interface 92 further allows the supplied diluent (e.g. water) to flow into the system casing 95 where the diluent flows along the length of the steam generator towards an opposing end.

From the mixer portion 94, the fuel-air mixture and cooling-air flow through an injector portion 96 where the fuel-air mixture flows over a catalytic reactor while the cooling air passes over the conduits carrying the fuel. The injector portion may be similar to that described in commonly owned U.S. Pat. No. 6,174,159 or U.S. Pat. No. 6,394,791 entitled "Method and Apparatus for a Catalytic Firebox Reactor", both of which are incorporated herein by reference in their entirety. The fuel-air mixture and cooling air are recombined at an end 99 where the recombined flows are ignited and burned within the combustor 100 generating temperatures up to 3992° F. (2200 C) for example. It should be appreciated that the temperature of the combustion gasses may be higher or lower depending on the fuel and oxidant used. The hot combustion gas flows into a steam generator portion 102 where water from the system casing 95 flows through spray nozzles 104 into the combustion gas to generate steam. It should be noted that in another embodiment oxygen or oxygen enriched air could be substituted for air in the combustion process.

Figure 7:
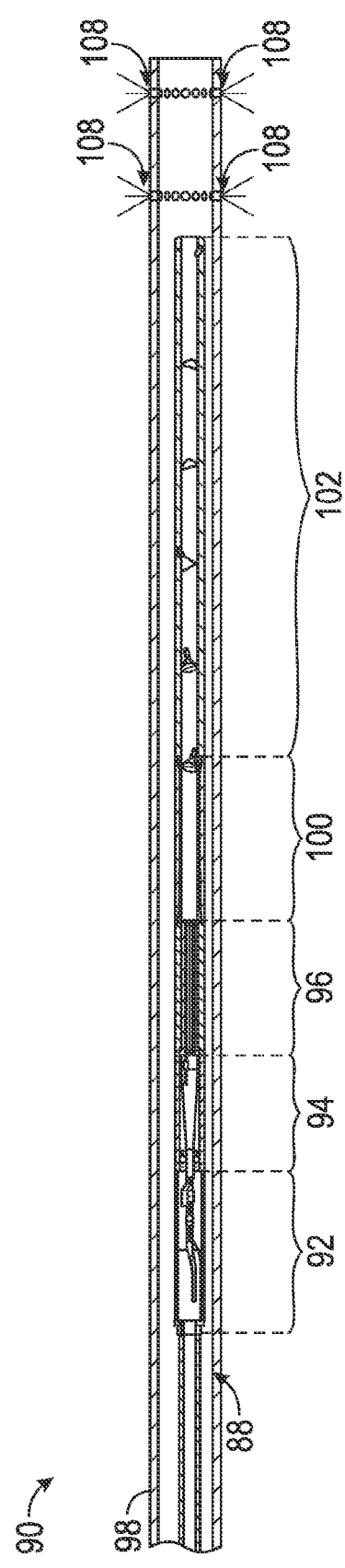
FIG. 7 is a side sectional view, partially in section, of the downhole apparatus of FIG. 6 within a well casing.
Figure 8:
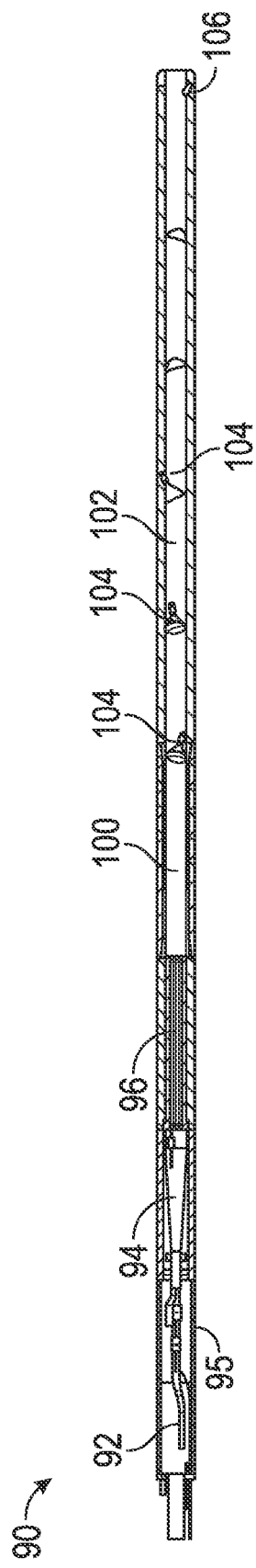
FIG. 8 is a side section view, partially in section, of the downhole apparatus of FIG. 6.

The diluent (e.g. steam) and combustion gas exit the downhole apparatus at a terminal end 106 where the diluent and combustion gas enter the well casing 98 and may exit into the oil reservoir via perforations 108 (FIG. 7). The perforations 108 allow the diluent (e.g. steam) and heat to penetrate the heavy oil reservoir as described herein above. In other embodiments, the well casing 98 may not have perforations and the diluent (e.g. steam) flows through an end of the well casing (open hole configuration) or the terminal end 106 is placed directly in the oil reservoir. In still other embodiments, the well casing may have slotted openings or screens.

It should be appreciated that due to the temperatures generated by the downhole apparatus 90, thermal expansion may cause components of the mixer 94, injector 96, combustor 100 and d generator portion 102 to expand, bend or otherwise deform. In one embodiment, to accommodate this expansion, a plurality of ribs 107 are disposed between the injector 96 and the inner surface of the system casing 95. In an embodiment, there are three sets of ribs arranged along the length of the downhole apparatus 90, each set having three ribs disposed (equidistant) about the circumference of the mixer 94, injector 96 and the steam generator portion 102. The ribs 107 function to maintain the mixer 94, injector 96, combustor 100, and steam generator portion 102 centered within the system casing 95. The ribs 107 have a curved outer surface that allows the ribs 107 to slide along the system casing 95 as components expand. In one embodiment, the mixer 94, injector 96, combustor 100 and steam generator portion 102 are fixed to the system casing 95 at the terminal end 106. As a result, thermal expansion will move the mixer 94, injector 96, combustor 100 and steam generator portion 102 towards the inlet. The use of flexible tubing within the interface 92 accommodates expansion of components during operation. In other embodiments, thermal expansion may be accommodated using a bellows system or other means.

Figure 9:
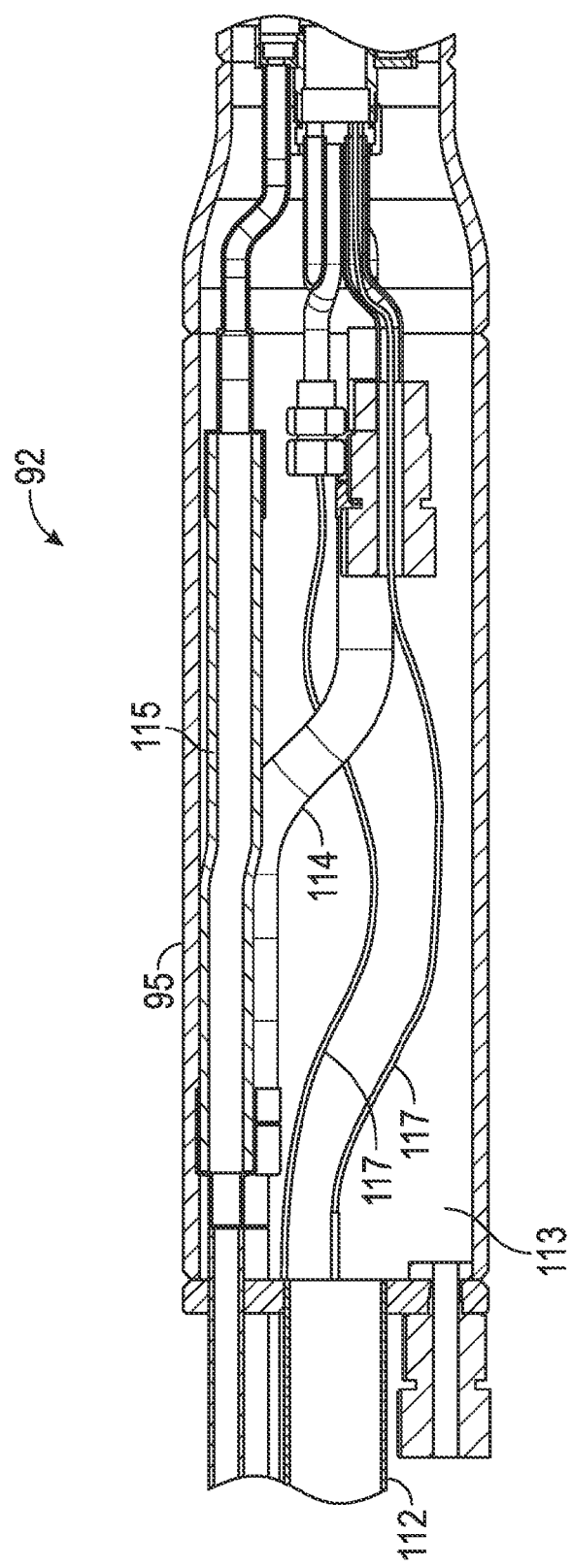
FIG. 9 is a partial side sectional view of the interface section of the downhole apparatus of FIG. 6.

Referring now to FIG. 9, an embodiment of the interface 92 is shown. In this embodiment, the interface 92 includes an end 110 having a plurality of ports on the end of the system casing 95. The ports provide a point of entry for the conduits, data and power lines of the umbilical 88 (FIG. 5). In one embodiment, the system casing 95 is a 3 inch (76.2 mm) stainless steel pipe. Diluent, such as water, is received into the casing from conduit 112, such as a 1.5 inch (38.1 mm) tube for example. The water is received into an interior 113 of the system casing 95 and flows through a conduit defined by the inner surface of the system casing and the outside surfaces or the combustor and steam generator towards the opposite end 106 (FIG. 8) where the water is sprayed into the combustion gas to generate steam. It should be appreciated that the flow of water over the components in the downhole apparatus 90 facilitates cooling of the injector 96, combustor 100 and steam generator portion 102. Air is received from a pair of conduits 114 (only one air conduit is shown for purposes of clarity), while fuel is received via conduit 115. In an embodiment, the conduits 114, 115 are fabricated from flexible tubing. In an embodiment, the conduits 114, 115 are made from 0.5 inch (12.7 mm) stainless steel tube for example. As discussed above, the flexible tubing allows the interface 92 to accommodate thermal expansion that occurs during operation.

The ports in end 110 further allow data and electrical port transmission lines 117 to enter the system casing 95. These lines may be used for transmitting electrical power, such as to a spark igniter or a resistance heater for example. Other lines may be used for transmitting data, such as from thermocouples for example, that allow the control module 46 to monitor the operation of the downhole apparatus 90. Other lines may also be used to control valves or other flow components for system control.

Figure 10:
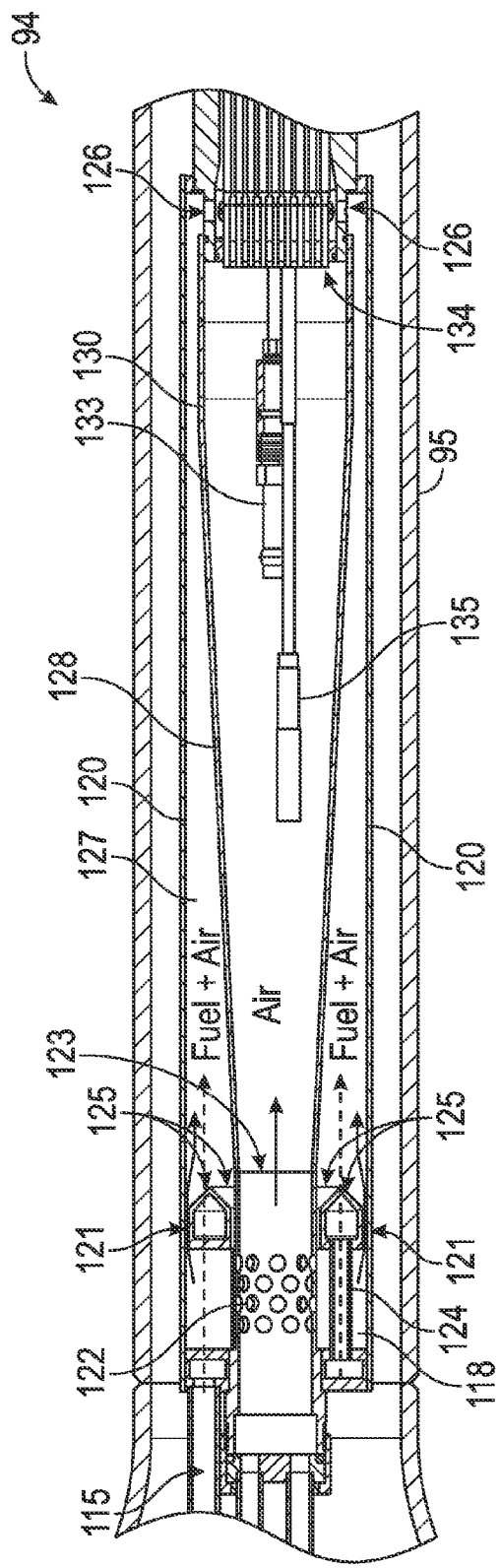
FIG. 10 is a partial side sectional view of an embodiment of the air fuel mixing portion of the downhole apparatus of FIG. 6.

Referring now to FIG. 10 an embodiment of mixer 94 is shown that mixes the fuel from conduit 115 with a portion of the air from conduits 114. In one embodiment, the fuel is received into a fuel injection bar 124 that injects the fuel into an interior cavity 127 via a plurality of nozzles 125. Simultaneously, air is received from conduits 114 into a balancing chamber 118 which divides the air into a first and second fluid path. The balancing chamber includes a plurality of openings 122 and an outlet 123. The openings 122 are disposed about the inner tube circumference of the chamber 118. In this embodiment, the size of the openings 122 and the outlet 123 are configured to allow a first portion of the air to flow along a first fluid path through the gaps 121 between the fuel injection bar 124 and the housing 120. The first portion of air then flows into cavity 127 while the second portion of air passes through the openings 122 along a second fluid path to the output port or outlet 123. In one embodiment, the first portion comprises 20% of the air and the second portion comprises 80% of the air. As will be discussed in more detail below, the second portion of air is cooling air for the injector 96. The cavity 127 allows air and fuel to mix and is defined by the cooling air conduit 128 and a housing 130. The air-fuel mixture then flows along the length of the mixing portion 94 to outlet ports 126.

Air flowing through the outlet 123 passes into the interior of conduit 128. In one embodiment, the conduit 128 is conically shaped having a first end adjacent the outlet 123 having a smaller diameter than the opposite end 134. In one embodiment, the ignition device, such as spark igniter 133 or resistance heater 135 for example, may be arranged within the conduit 128. It should be appreciated that ignition device may be connected to electrical power or data lines 117 (not shown in FIG. 10 for clarity). It should further be appreciated that in some embodiments, the downhole apparatus 90 may only have one ignition device, such as either the spark igniter or the resistance heater for example. In other embodiments, the ignition source may be formed by injecting hydrogen into the fuel supply. The hydrogen reacts with the catalyst discussed below to auto-ignite the fuel air mixture.

Figure 11A:
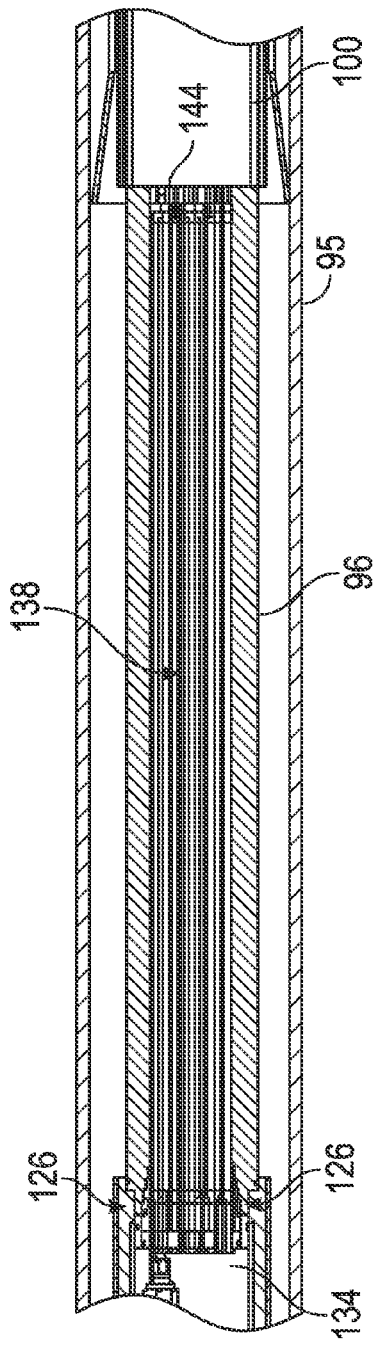
FIGS. 11A and 11B are a partial side sectional views of the catalytic reactor portion of the downhole apparatus of FIG. 6.
Figure 11B:
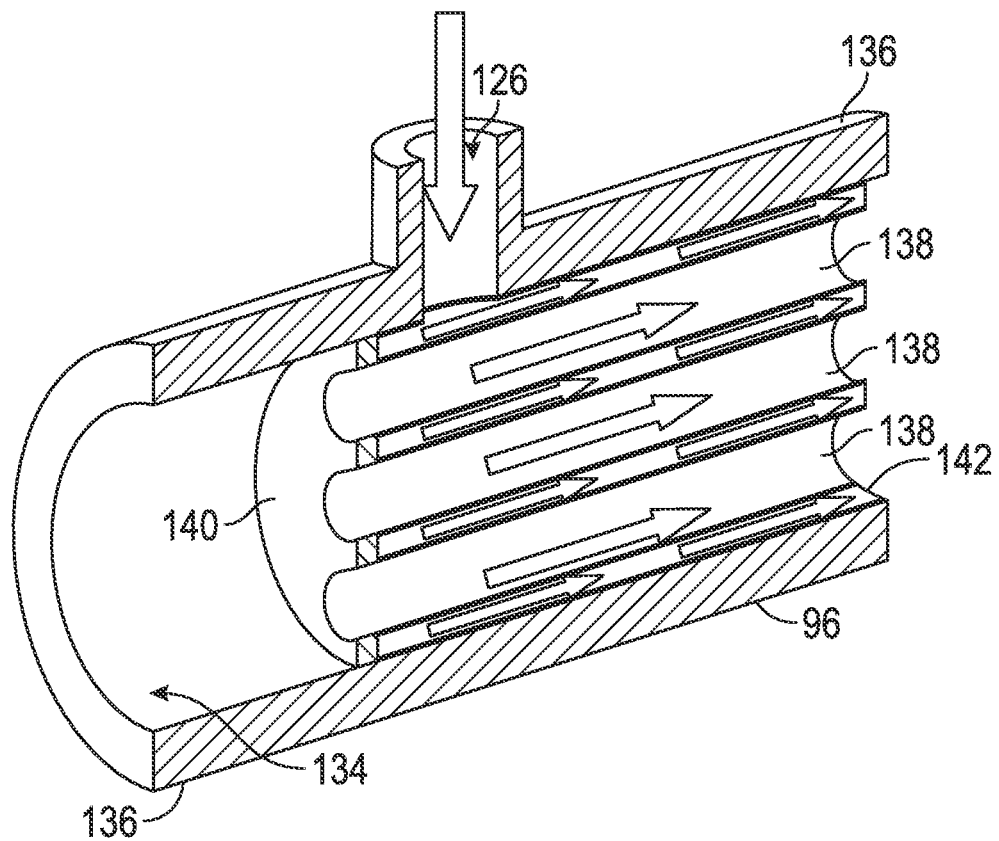

In one embodiment, the air-fuel mixture flows radially as shown in FIGS. 11A-11B into the injector 96 from the mixer outlet port 126. The injector 96 comprises a housing 136 which receives the second portion of air (cooling air flow) from the end 134 and routes the second portion of air into a fluid path defined by the interior surface of a plurality of tubes 138. The exterior surface of the tubes 138, which defines another fluid path, is coated with an oxidation catalyst as will be discussed in more detail below. In one embodiment, the tubes 138 are coupled to an end plate 140. The end plate 140 causes the second air portion to flow into the tubes 138 and prevents intermixing of the cooling air with the air-fuel mixture. The air-fuel mixture enters the injector 96 via the ports 126 and flows along a space defined by the interior wall 142 of the housing 136 and the exterior surfaces of tubes 138. As such, the fuel-air mixture contacts the oxidation catalyst.

The catalyst coating used in the present invention, where the fuel is a hydrocarbon and air or oxygen is the oxidizer, may include precious metals, group VIII noble metals, base metals, metal oxides, or any combination thereof Elements such as zirconium, vanadium, chromium, manganese, copper, platinum, gold, silver, palladium, osmium iridium, rhodium, ruthenium, cerium, and lanthanum, other elements of the lanthanide series, cobalt, nickel, iron and the like may also be used. The catalyst may be applied directly to the substrate, or may be applied to an intermediate bond coat or wash coat composed of alumina, silica, zirconia, titania, manesia, other refractory metal oxides, or any combination thereof It should be appreciated that during operation, the fuel-air mixture reacts with the catalyst coating on the exterior surface of the tubes 138 forming an exothermic reaction. By flowing the air through the interior of the tubes 138, the temperature of the injector 96 may be maintained within a desired operating range for the materials used while also preheating the cooling air prior to combustion. In the one embodiment, the injector 96 includes sixty-one (61) tubes 138 having an outer diameter of 0.125 inches (3.175 mm) and are made from a suitable high temperature material, such as utilized in an aerospace industry (e.g. titanium, aluminum, nickel or high temperature capable super alloys). Other number of and diameter of tubes could be utilized in the device depending on the desired output, diameter or the operating conditions.

In one embodiment shown in FIGS. 11C and 11D, the injector 96 includes one or more igniter devices 133. In this embodiment, the igniter devices 133 include a body member 137 and a conductive core 139. The body member 137 is made from a heat resistant, electrically insulation material, such as a ceramic for example. The body member 137 extends from the mixer portion 94 through the injector 96 and has an end that extends to the end 144. The igniter device 133 may be located on the periphery of the injector 96 adjacent to or interspersed between the outer-row of tubes 138.

The conductive core 139 extends through the middle of the body member and has an electrode 141 arranged on one end that extends at least partially into the combustor 100. The conductive core 139 is electrically coupled to a power source, such as via control module 46, to a battery arranged internal to the downhole apparatus, or to an internal power generator such as a thermoelectric generator for example. Conductive core 139 is configured to generate an electrical arc from the electrode 141 to the housing 136. In another embodiment, the electrode is oriented to generate the electrical arc to the end of tubes 138. The generation of the electrical arc in the presence of the fuel-air mixture and the cooling air initiates combustion in the combustor 100.

The pair of igniter devices 133 may be located opposite each other (opposite corners), or substantially opposite (one in corner, the other arranged on the middle of an opposite side). It should be appreciated that while embodiments herein discuss the use of a pair of igniter devices 133 this is for example purposes and the claimed invention should not be so limited. The use of a pair of igniter devices is preferred for redundancy purposes; however combustion may be initiated with a single igniter device 133.

Figure 12:
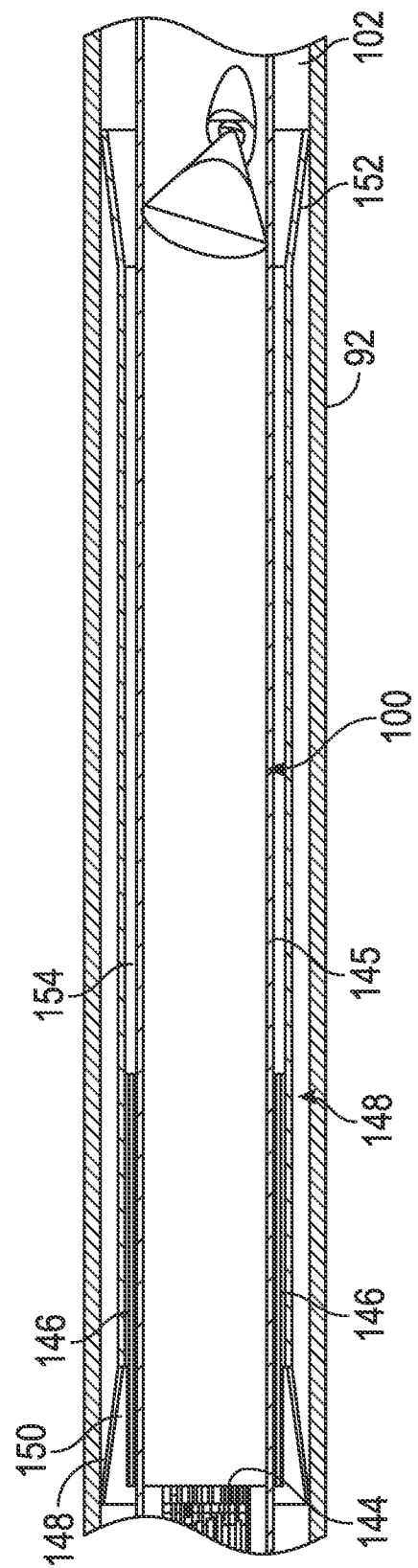
FIG. 12 is a partial side sectional view of a combustor portion of the downhole apparatus of FIG. 6.

Referring now to FIG. 12, the cooling air and the air-fuel mixture exit the injector 96 at the opposite end 144 and enter the combustor 100. An igniter, such as igniter 133 for example, is arranged adjacent the end 144 and initiates combustion of the fuel and air. In an embodiment, the temperature of the combustion gas is about 3992° F. (2200 C). As discussed above, the combustion gas temperature may be higher or lower based on the fuel and oxidant used. The combustor 100 includes a liner 145 which receives the air and fuel and is where the combustion occurs. Adjacent the end 144, a plurality of fins 146 extend radially about the periphery of the exterior of the liner 145. It should be appreciated that the fins 146 facilitate heat transfer from the liner 145. In one embodiment, the fins 146 extend along a portion of the liner 145. In one embodiment, the fins 145 may be formed from a series of sequential fins (e.g. three), or may be formed from a single unitary and monolithic fin. Disposed between the fins 145 and the system casing 95 is a shroud 148. The shroud 148 includes an inlet 150 that tapers from the inner diameter of the system casing 95 to the outer diameter of the fins 146. It should be appreciated that the shroud 148 causes the diluent, such as water, flowing through the system casing 95 into a channel 154 defined between the inner diameter of the shroud 148 and the outer diameter of the liner 145. The water flows through the channel 154 to an outlet 152 which tapers outward to the inner diameter of system casing 95.

The combustion gases flow from the combustor 100 into the generation portion 102. The generation portion 102 extends from the outlet 152 to the terminal end 106. In an embodiment where the diluent is water, the generation portion 102 generates steam. In this embodiment, the steam generation portion 102 shown in FIG. 13 includes a housing 156 having a plurality of nozzles 104 that spray water from the system casing 95 into the combustion gases. It should be appreciated that due to the high temperature of the combustion gases, the water sprayed into the housing 156 is vaporized into steam. The steam and combustion gas mixture exit the housing 156 at the terminal end 106.

In one embodiment, the nozzles 104 are configured to spray water in a direction that is at least partially towards the combustor 100. In other words, the stream of water from the nozzles 104 is directed upstream or in a counter-flow configuration. In one embodiment, six (6) nozzles 104 are arranged on 30° angle relative to the centerline of the steam generator portion 102 and configured to spray the water in a 60° cone. In one embodiment, the nozzles 104 are offset from each other both longitudinally and circumferentially about the housing 156. In one embodiment, adjacent nozzles 104 are circumferentially offset 60° relative to each other. The nozzles 104 may be configured to operate with dissolved solids in the supply water.

Referring to FIG. 14, one embodiment is shown for the nozzle assembly 160. The nozzle assembly 160 includes the nozzle 104 and a boss member 162. The boss member 162 has a generally cylindrically body with a hole extending therethrough. A portion of the hole is threaded to receive the external threads on the nozzle 104. The front surface of the boss member 162 extends into the interior of the housing 156. The leading and trailing surfaces are angled to reduce the drag profile of the boss member 162 within the combustion-gas/steam stream. In one embodiment, the nozzle 104 includes a filter to reduce the risk of clogging. In still other embodiments, nozzles may be pointed perpendicular to the flow or downstream of the flow.

It should be appreciated that embodiments described herein provide advantages in extracting heavy oil from reservoirs deep within the ground. Substantially all of the thermal energy generated is applied to the oil reservoir with little or no losses. These embodiments further allow the extraction of heavy oil while reducing water-usage and emissions and provide for the sequestration of $CO_2$. As a result, embodiments of the subject invention reduce the overall cost per barrel of produced heavy oil.

Further, the non-condensable portions of the steam and combustion gas mixture may pressurize the reservoir to facilitate flow of oil through the production/extraction well and may contribute to slowing the rate of heat loss to the overburden. Further, the increase of $CO_2$ within the oil from the combustion gas mixture increases oil volume and may reduce viscosity to further facilitate oil flow. As a result, the subject invention may provide advantages in reducing or eliminating the parasitic loads (e.g. pumps) used in the extraction of oil, and may provide a source of non-condensable gases and heat for the purpose of producing even lighter fractions of oil than heavy.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for producing oil from an oil reservoir having a well, the system comprising:
    a support module, the support module comprising:
    an air module,
    a water module, and
    a fuel module,
    a steam module comprising:
        a system casing;
        a mixer portion disposed within the system casing, the mixer portion comprising:
            a housing having a first end,
            a conduit centrally disposed within the housing, an outside periphery of the conduit and the inside periphery of the housing cooperating to define a hollow interior portion, the conduit having a plurality of openings disposed about a periphery of one end of the conduit, the plurality of openings arranged to fluidly couple the hollow interior portion with an interior portion of the conduit;
            a first inlet on the first end of the housing arranged to fluidly couple to the fuel module to the hollow interior portion,
            a second inlet on the first end of the housing arranged to fluidly couple the air module to the hollow interior portion;
        a combustor operably coupled to and spaced apart from the mixer portion, the combustor arranged to receive an air and an air-fuel mixture from the mixer portion to form combustion gases;
        a steam generator coupled to an end of the combustor.

2. The system of claim 1 further comprising:
    an injector portion having a first fluid path and a second fluid path, wherein the mixer portion is configured to divide air from the second inlet into a first portion and a second portion, the first portion being mixed with a fuel to form the fuel-air mixture, the mixer portion further including a first output port that fluidly couples the fuel-air mixture to the first fluid path and a second output port that fluidly couples the second portion of air to the second fluid path;
    wherein the conduit includes a first cylindrical portion, a conical portion extending from the first cylindrical portion, and a second cylindrical portion extending from the conical portion opposite the first cylindrical portion, the plurality of openings being arranged in the first cylindrical portion, an end of the conical portion adjacent the second cylindrical portion being a larger diameter than an end adjacent the first cylindrical portion, the first fluid path extending through the conduit, the second fluid path extending within the hollow interior portion around the conduit; and
    wherein the steam generator includes at least one nozzle coupled to an outside surface of the steam generator and configured during operation to spray water from the water module into the combustion gases in the steam generator, a direction of spray being at least partially towards the combustor.

3. The system of claim 2 wherein the steam module is arranged within the well distal from the support module.

4. The system of claim 2 wherein the injector portion includes a plurality of tubes having an oxidizing catalyst on exterior surfaces thereof, the first fluid path defined by the exterior surfaces of the plurality of tubes and fluidly coupled to receive the air-fuel mixture from the mixer portion, the second fluid path defined by interior surfaces of the plurality of tubes and fluidly coupled to receive the air from the mixer portion.

5. The system of claim 4 wherein the oxidizing catalyst is configured to auto-ignite the air-fuel mixture when hydrogen is added to a fuel conduit from the fuel module.

6. The system of claim 2 wherein the combustor includes a plurality of fins disposed about a periphery of a liner.

7. The system of claim 6 further comprising a shroud coupled between the combustor and the system casing, the shroud having inlet that tapers from a first diameter to a second diameter, the plurality of fins being at least partially disposed within the second diameter, wherein the shroud at least partially defines the water conduit.

8. A method of producing oil from a heavy oil reservoir having a well, the method comprising:
    supplying air, water and fuel to a steam generator;
    dividing the supplied air into a first portion and a second portion in a mixer portion of the steam generator by flowing the first portion of air through a plurality of openings disposed about a periphery of a conduit while flowing the second portion of air external to the conduit;
    mixing the second portion with the supplied fuel to form a fuel-air mixture;
    flowing the first portion of air through reactor tubes, the reactor tubes having an oxidation catalyst on an outer surface;
    flowing the fuel-air mixture over the outer surface of the reactor tubes;
    mixing the first portion of air and the fuel-air mixture prior to and spaced apart from a combustor;
    burning in a combustor the mixed first portion of air and the fuel-air mixture to produce combustion gases;
    directing the combustion gases into a steam generator;
    flowing the water through a conduit thermally connected to the combustor and steam generator;
    spraying water onto the combustion gases to form steam, the water being at least partially sprayed in a direction towards the combustor; and
    directing the steam and the combustion gases into an oil reservoir.

9. The method of claim 8 further comprising positioning the steam generator within a well distal from a surface of the well prior to supplying air, water and fuel.

10. The method of claim 9 further comprising:
    flowing hydrogen over the outer surface of the reactor tubes; and
    auto-igniting the fuel-air mixture when hydrogen contacts the oxidation catalyst.

11. The method of claim 10 wherein the mixed first portion of air and the fuel-air mixture is burned in the combustor.

12. The method of claim 11 further comprising:
providing the combustor with a plurality of fins disposed about the periphery of the combustor;
flowing water over the plurality of fins; and
transferring heat from a liner of the combustor through the plurality of fins to the water.

13. The method of claim 12 further comprising:
providing a shroud between the liner and a system casing, the shroud tapering from an inlet with a first diameter to a second diameter, the plurality of fins being at least partially disposed within the second diameter; and
flowing the water through the shroud inlet prior to being sprayed into the combustion gases.

14. The method of claim 13 further comprising:
providing the system casing, the mixer portion and the combustor being arranged within the system casing; and
configuring the mixer portion and combustor portion to move within the system casing due to thermal expansion during operation.

15. A system for producing oil from an oil reservoir having a well, the system comprising:
a system casing;
a combustor arranged within the system casing and configured to combust a fuel during operation;
a diluent generator having a first end fluidly coupled to receive combustion gases from the combustor, the diluent generator further having a second end fluidly coupled to the oil reservoir;
a diluent conduit fluidly arranged between the inner surface of the system casing and an outside surface of the combustor and the diluent generator, the diluent conduit extending along the length of the combustor and diluent generator; and
at least one nozzle coupled to the outside surface of the diluent generator and configured during operation to spray a diluent fluid into the combustion gases in the diluent generator, a direction of spray being at least partially towards the first end.

16. The system of claim 15 wherein the diluent fluid is selected from a group consisting of: water, carbon dioxide and nitrogen.

17. The system of claim 16 wherein the system is located within the well distal from a surface.

18. The system of claim 17 wherein the diluent conduit is at least partially disposed between an outer surface of the diluent generator and the inner surface of the system casing.

19. The system of claim 18 wherein the combustor further includes a plurality of fins disposed about a periphery of a combustor outer surface.

20. The system of claim 19 further comprising a shroud member disposed between the combustor outer surface and the inner surface of the system casing, the shroud member having a tapered inlet that is fluidly coupled to the diluent conduit.

21. The system of claim 20 further comprising
an injector fluidly coupled to an end of the combustor opposite the diluent generator, the injector having a plurality of tubes having an oxidizing catalyst on exterior surfaces thereof, the injector configured with a first flow path defined by interior surfaces of the plurality of tubes and fluidly coupled to receive a first flow of oxidant from an oxidant conduit; the injector further configured with a second flow path defined by the exterior surfaces of the plurality of tubes and fluidly coupled to receive a second flow of oxidant from the oxidant conduit and a flow of fuel from a fuel conduit;
wherein the oxidizing catalyst is configured to auto-ignite an oxidant-fuel mixture when hydrogen is added to the fuel conduit.

22. A system for producing oil from an oil reservoir having a well, the system comprising:
a system casing;
a fuel conduit and an oxidant conduit movably arranged within the system casing;
a mixer arranged within the system casing and configured to receive an oxidant and a fuel from the fuel conduit and the oxidant conduit,
a combustor portion disposed within the system casing and operably coupled to and spaced apart from an end of the mixer and configured to form combustion gases;
a diluent generator portion disposed within the system casing and operably coupled to the combustor portion opposite the mixer, the diluent generator portion having a terminal end coupled to the system casing;
a diluent conduit extending along the length of and thermally coupled to the combustor and diluent generator;
at least one nozzle coupled to the diluent generator and fluidly coupled to the diluent conduit, the at least one nozzle being positioned to spray a diluent fluid from the diluent conduit in a direction towards the combustor portion; and
at least one centering member slidably engaging an inside surface of the system casing and is operably coupled to the mixer, the combustor portion and the diluent generator portion.

23. The system of claim 22 wherein the diluent generator portion is configured to receive a diluent fluid selected from a group consisting of: water, carbon dioxide and nitrogen.

24. The system of claim 23 wherein the system is located within the well distal from a surface of the well.

25. The system of claim 24 wherein the at least one nozzle includes a plurality of nozzles axially arranged along the diluent generator portion, wherein each of the plurality of nozzles is circumferentially offset from adjacent nozzles.

26. The system of claim 25 further comprising an interface portion disposed within an end of the system casing opposite the terminal end, the interface portion including a plurality of flexible conduits arranged to transfer the oxidant and the fuel to the mixer.

27. A system for producing oil from an oil reservoir having a well, the system comprising:
a system casing;
an injector disposed within the system casing and fluidly coupled to a fuel air mixing portion, the injector having a plurality of tubes having an oxidizing catalyst thereon, the injector having at least one igniter integrally formed therein, the at least one igniter having a spark mechanism on an opposite end from the fuel air mixing portion;
a combustor disposed within the system casing and fluidly coupled to the injector adjacent the spark mechanism, the combustor configured to receive during operation an air-fuel mixture and burn the air-fuel mixture in response to the spark mechanism being activated;
a diluent generator disposed within the system casing and arranged to receive combustion gases from the combustor and mix a diluent fluid with the combustion gases;

a diluent conduit extending along the length of and thermally coupled to the combustor and diluent generator; and at least one nozzle coupled to the diluent generator and fluidly coupled to the diluent conduit, the at least one nozzle being positioned to spray a diluent fluid from the diluent conduit in a direction towards the combustor portion.

28. The system of claim 27 wherein the spark mechanism further includes a ceramic member extending a length of the injector.

* * * * *